(12) United States Patent
Grelaud et al.

(10) Patent No.: US 11,247,676 B2
(45) Date of Patent: Feb. 15, 2022

(54) METHOD FOR AUTOMATICALLY ADJUSTING THE SPEED OF A MOTORCYCLE

(71) Applicant: Robert Bosch GmbH, Stuttgart (DE)

(72) Inventors: Mathieu Grelaud, Stuttgart (DE); Michael Schoenherr, Renningen-Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 16/469,478

(22) PCT Filed: Nov. 16, 2017

(86) PCT No.: PCT/EP2017/079463
§ 371 (c)(1),
(2) Date: Jun. 13, 2019

(87) PCT Pub. No.: WO2018/108436
PCT Pub. Date: Jun. 21, 2018

(65) Prior Publication Data
US 2020/0108830 A1    Apr. 9, 2020

(30) Foreign Application Priority Data
Dec. 14, 2016    (DE) .......................... 102016224913.4

(51) Int. Cl.
*B60W 30/16*    (2020.01)

(52) U.S. Cl.
CPC ......... *B60W 30/16* (2013.01); *B60W 2300/36* (2013.01); *B60W 2554/801* (2020.02)

(58) Field of Classification Search
CPC ...... B60W 30/00; B60W 30/14; B60W 30/16; B60W 2554/00; B60W 2554/80; B60W 2554/801; B60W 2300/00; B60W 2300/36
See application file for complete search history.

(56) References Cited

U.S. PATENT DOCUMENTS 8,473,144 B1    6/2013    Dolgov et al.
8,775,047 B2 *   7/2014    Breuer .................. B60T 8/4818
                                                     701/70
(Continued)

FOREIGN PATENT DOCUMENTS

CN    104395168 A    3/2015
CN    105006174 A    10/2015
(Continued)

OTHER PUBLICATIONS

International Search Report dated Feb. 12, 2018 of the corresponding International Application PCT/EP2017/079463 filed Nov. 16, 2017.
(Continued)

*Primary Examiner* — Geepy Pe
*Assistant Examiner* — Michael Allen Brace, Jr.
(74) *Attorney, Agent, or Firm* — Norton Rose Fulbright US LLP; Gerard Messina

(57) ABSTRACT

In a method for automatically adjusting the speed of a motorcycle as a function of the longitudinal distance as well as the lateral distance of a motorcycle from a preceding other vehicle, a minimum lateral distance to be maintained is determined as a function of the type of the other vehicle.

7 Claims, 2 Drawing Sheets

(56) References Cited

U.S. PATENT DOCUMENTS

| | | | |
|---|---|---|---|
| 9,213,337 B1* | 12/2015 | Ferguson | G01S 13/931 |
| 10,032,366 B2* | 7/2018 | Bodurka | G01S 15/88 |
| 2005/0012603 A1* | 1/2005 | Ewerhart | B62D 15/029 |
| | | | 340/435 |
| 2014/0028487 A1* | 1/2014 | Ishimori | G01S 13/345 |
| | | | 342/70 |
| 2014/0121880 A1* | 5/2014 | Dolgov | B60W 10/20 |
| | | | 701/23 |
| 2014/0376769 A1* | 12/2014 | Bulan | G06K 9/00771 |
| | | | 382/103 |
| 2017/0039855 A1* | 2/2017 | Maeda | B60W 30/09 |
| 2017/0080952 A1* | 3/2017 | Gupta | B60W 50/14 |
| 2017/0144665 A1* | 5/2017 | Ohashi | G08G 1/166 |
| 2018/0124323 A1* | 5/2018 | Wagmann | H04N 5/23293 |
| 2018/0149740 A1* | 5/2018 | Tamura | G01S 13/867 |

FOREIGN PATENT DOCUMENTS

| | | |
|---|---|---|
| CN | 105247591 A | 1/2016 |
| CN | 107408346 A | 11/2017 |
| EP | 2241498 B1 | 7/2014 |
| JP | 2009116882 A | 5/2009 |
| JP | 2010070061 A | 4/2010 |
| JP | 2016038837 A | 3/2016 |
| WO | 2016021607 A1 | 2/2016 |

OTHER PUBLICATIONS

"Sicherheitsabstand—Wikipedia", Dec. 6, 2016 (Dec. 6, 2016), XPO55446275, Retrieved from the internet: URL https://de.wikipedia.org/w/index.php?title=Sicherheitsabstand&oldid=160402131.

* cited by examiner

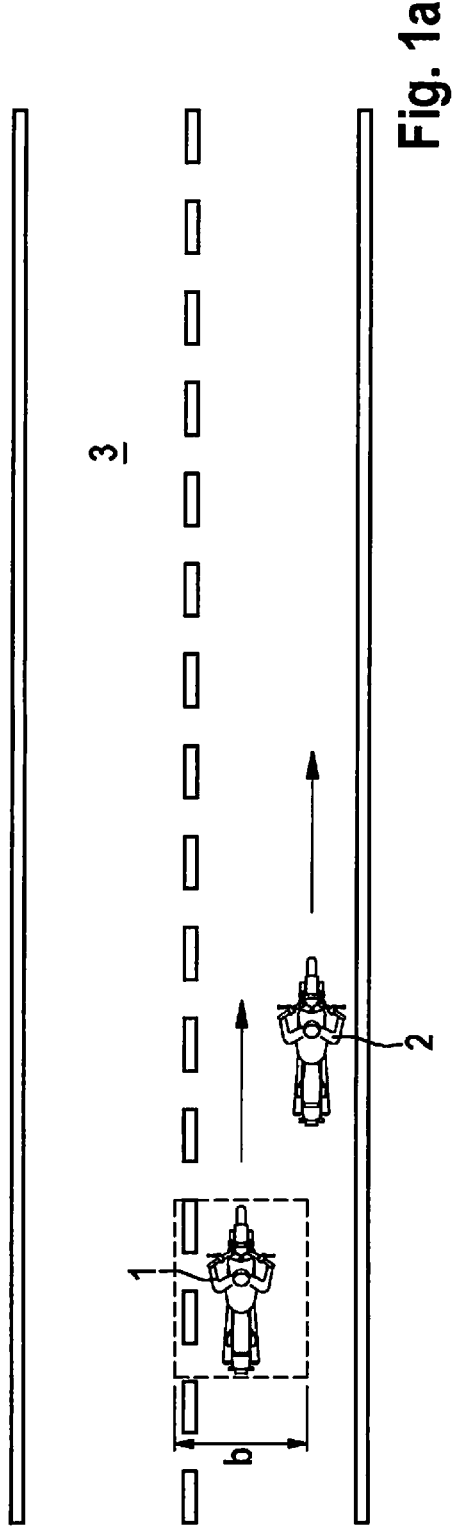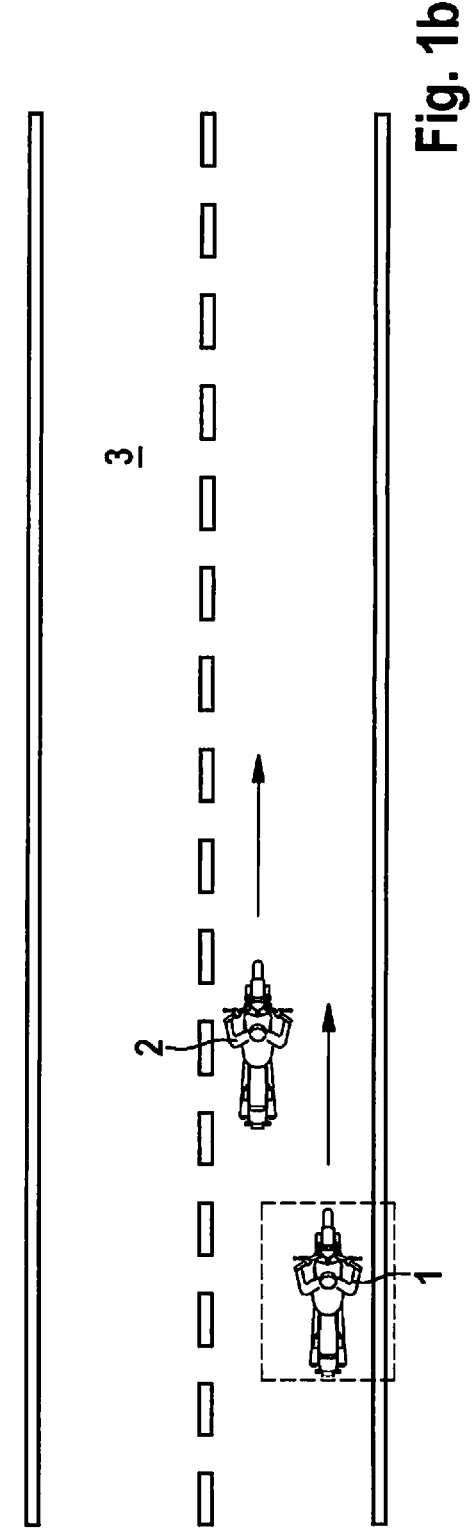

METHOD FOR AUTOMATICALLY ADJUSTING THE SPEED OF A MOTORCYCLE

CROSS-REFERENCE TO RELATED APPLICATIONS

The present application is the national stage of International Pat. App. No. PCT/EP2017/079463 filed Nov. 16, 2017, and claims priority under 35 U.S.C. § 119 to DE 10 2016 224 913.4, filed in the Federal Republic of Germany on Dec. 14, 2016, the content of each of which are incorporated herein by reference in their entireties.

FIELD OF THE INVENTION

The present invention relates to a method for automatically adjusting the speed of a motorcycle.

BACKGROUND

EP 2 241 498 B1 describes a speed-control device for a motorcycle which makes it possible to maintain the motorcycle automatically at a preset speed. Such speed-control devices are also known as cruise controls.

Moreover, from the automotive sector, adaptive speed-control devices are known which are equipped additionally with a radar-based distance-detection system, with whose aid the distance between the vehicle and a preceding other vehicle is detected. The actual vehicle speed is adjusted adaptively as a function of the set desired speed and as a function of the detected distance to the preceding other vehicle.

SUMMARY

An example embodiment of the present invention is directed to a method of automatic adjustment of the driving speed of a motorcycle, taking into account the longitudinal distance as well as the lateral distance between the motorcycle and another vehicle preceding it or traveling to the side of it. In doing so, analogous to adaptive speed-control systems in motor vehicles, the distance between the motorcycle and another vehicle is determined continuously, the actual speed of the motorcycle being a function of the instantaneous longitudinal distance as well as the instantaneous lateral distance between the motorcycle and the other vehicle. A safety distance between the motorcycle and the other vehicle is thereby ensured, depending on the speed.

In the method according to the present invention, the minimum lateral distance to be maintained between the motorcycle and the other vehicle is determined as a function of the type of the other vehicle. In particular, it is possible to differentiate between wider and narrower other vehicles, especially between automobiles and two-wheeled vehicles like motorcycles, for example, which likewise are considered as other vehicle for the purpose of the present invention.

The minimum lateral distance as a function of the type of vehicle makes it possible to realize an adaptive cruise control function for a motorcycle that is adjusted to the type of the preceding vehicle. In particular, it is possible to differentiate between motorcycles or two-wheeled vehicles on one hand, and motor vehicles such as passenger cars or trucks on the other hand.

For example, in the case of motorcycles driving in groups, this procedure makes it possible to realize an adaptive speed-control system without running the risk that the motorcycle will get closer to a preceding other motorcycle in a jeopardizing manner and possibly even execute a passing maneuver without changing lanes. Such dangerous driving situations can be avoided by way of the minimum lateral distance between the motorcycle and the other vehicle depending on the type of the vehicle.

It is possible to employ an adaptive cruise control system in the motorcycle which has, as driving-environment sensor system, only a distance-detection system for detecting the longitudinal distance as well as the lateral distance of the motorcycle from another vehicle preceding it and/or driving to the side of it, but not a lane-keeping system. Accordingly, relatively easily-constructed adaptive motorcycle cruise control systems can be realized, without safety losses.

According to an example embodiment, the minimum lateral distance is greater in the case of other vehicles that are narrower and smaller in the case of other vehicles that are wider. If the preceding other vehicle is another motorcycle having a correspondingly small width, a larger minimum lateral distance is specified, which is to be honored during a passing maneuver. If the set motorcycle speed is greater than the speed of the preceding other motorcycle, the motorcycle gets closer to the preceding other motorcycle, a passing maneuver only being possible if the minimum lateral distance between the motorcycle and the other motorcycle is adhered to. This minimum lateral distance usually necessitates a lane change by the approaching motorcycle that is equipped with the motorcycle adaptive cruise control system. The approaching motorcycle is thus prevented from being able to pass the preceding other motorcycle within the same lane. If the motorcycle drawing close does not change lanes, the motorcycle speed is reduced automatically to the extent that the speed-dependent, specified minimum longitudinal distance between the motorcycle and the preceding other motorcycle is maintained.

On the other hand, if the preceding other vehicle is a motor vehicle such as a passenger car or a truck having a greater width, then the minimum lateral distance can be set to a smaller value, since passing of the other vehicle is only possible if there is a lane change in any case. Because a smaller minimum lateral distance is selected in comparison to another motorcycle, passing of the other vehicle flows more smoothly and can be carried out in a shorter time.

Basically, it is sufficient that just two different vehicle-type classes and correspondingly, two different minimum lateral distances are able to be set, which correspond to a motorcycle on one hand and an automobile on the other hand. For example, the larger minimum lateral distance, which preferably is determined in the case of a preceding other motorcycle, lies in a value range between 1.60 m and 2.50 m. On the other hand, in the case of a preceding automobile, advantageously a smaller minimum lateral distance which lies, e.g., in a value range between 0.80 m and 1.50 m is determined in the following motorcycle.

However, it can also be expedient to define more than two different vehicle-type classes and minimum lateral distances, respectively, for example, to differentiate between three different vehicle-type classes of other vehicles, e.g., between a motorcycle, a passenger car and a truck, and to determine the minimum lateral distances accordingly. Moreover, within a permissible value range, it is also possible to determine a larger or smaller minimum lateral distance per vehicle type.

According to an example embodiment, the type of the other vehicle which is driving in front of the motorcycle is set by the driver of the motorcycle himself. From the vehicle type, the minimum lateral distance can be determined automatically in the adaptive cruise control and taken as a basis for adjusting the motorcycle speed. Thus, the motorcycle driver inputs the type of vehicle driving in front of him, into the adaptive cruise control system. Alternatively, it is also possible that the minimum lateral distance is selected by the driver directly in the adaptive cruise control system, defined distance classes advantageously being stored, between which it is possible to select.

In an example embodiment, the type of the preceding other vehicle is determined automatically in the adaptive cruise control system, especially using a suitable driving-environment sensor system, preferably via a camera-based system that takes an image of the preceding other vehicle which is evaluated in the adaptive cruise control. This approach has an advantage that no activity on the part of the driver is necessary for determining the minimum lateral distance.

The various method steps are executed in a control unit which is part of the adaptive cruise control system in the motorcycle. The adaptive cruise control system includes a distance-detection system to determine the longitudinal distance as well as the lateral distance between the motorcycle and the other vehicle preceding it or driving to the side of it. In the adaptive cruise control, control signals are generated for automatically adjusting the motorcycle speed via a suitable control of the motorcycle engine and/or the motorcycle brakes.

If the vehicle type and/or the minimum lateral distance is/are input by the driver into the motorcycle adaptive cruise control, it has a corresponding input unit which is able to be operated by the driver. In the event the preceding vehicle type is detected automatically, the adaptive cruise control is equipped with a suitable driving-environment sensor system such as a camera system, for example.

Additional advantages and useful embodiments can be gathered from the claims, the detailed description and the drawings, in which identical components and functions are provided with identical reference numerals.

BRIEF DESCRIPTION OF THE DRAWINGS

FIG. 1a shows a driving situation of a motorcycle equipped with an adaptive cruise control system, on a road with a preceding other motorcycle, according to an example embodiment of the present invention.

FIG. 1b shows a representation corresponding to FIG. 1a, but with the motorcycle in a different lateral position relative to the preceding other motorcycle, according to an example embodiment of the present invention.

DETAILED DESCRIPTION

FIGS. 1a and 1b show a motorcycle 1 that is following a preceding other vehicle 2 on a roadway 3. Other vehicle 2 in FIGS. 1a and 1b is likewise a motorcycle (hereinafter: other motorcycle). Motorcycle 1 is equipped with an adaptive cruise control system, with which a set motorcycle speed is adhered to automatically, taking into account the distance between motorcycle 1 and other motorcycle 2. The adaptive cruise control includes a distance-detection system that, in particular, is radar-based, and with which the distance between motorcycle 1 and other motorcycle 2 can be determined. Specifically, the distance-detection system in the adaptive cruise control makes it possible to determine both the longitudinal distance and the lateral distance between motorcycle 1 and other motorcycle 2.

Based on the detected distance between motorcycle 1 and other motorcycle 2 and in due consideration of the set motorcycle speed, the adaptive cruise control in motorcycle 1 intervenes automatically in the motorcycle engine and in the motorcycle brakes, in order to maintain a sufficient safety distance from preceding other motorcycle 2 both in the longitudinal direction and in the transverse direction.

The adaptive cruise control system makes it possible to set and to honor a minimum lateral distance between motorcycle 1 and other motorcycle 2, taking into account the type of other vehicle 2. The minimum lateral distance of motorcycle 1 is identified by the letter b and is dependent on the type of other vehicle 2. In the case of other motorcycle 2 in FIGS. 1a and 1b, minimum lateral distance b is selected to be relatively large and lies, e.g., in a value range between 1.60 m and 2.50 m. This relatively large minimum lateral distance ensures that in the case of a preceding other motorcycle 2, a passing maneuver when the adaptive cruise control is activated is only possible if motorcycle 1 properly changes lanes. On the other hand, with the adaptive cruise control activated, there is no possibility that motorcycle 1 would pass other motorcycle 2 on the left side (FIG. 1a) or on the right side (FIG. 1b) within the same lane, since other motorcycle 2 would still be located within minimum lateral distance b of motorcycle 1, which is recognized by the adaptive cruise control.

Upon approaching preceding other motorcycle 2 and reaching the minimum longitudinal distance, the speed of motorcycle 1 is throttled, especially to the same speed as preceding other motorcycle 2, which can be seen with the aid of the same-sized speed arrows in the longitudinal direction in connection with motorcycle 1 and other motorcycle 2. Passing within the same lane is not possible, and can only be done in the event motorcycle 1 changes from the right to the left lane.

Figure 2A:
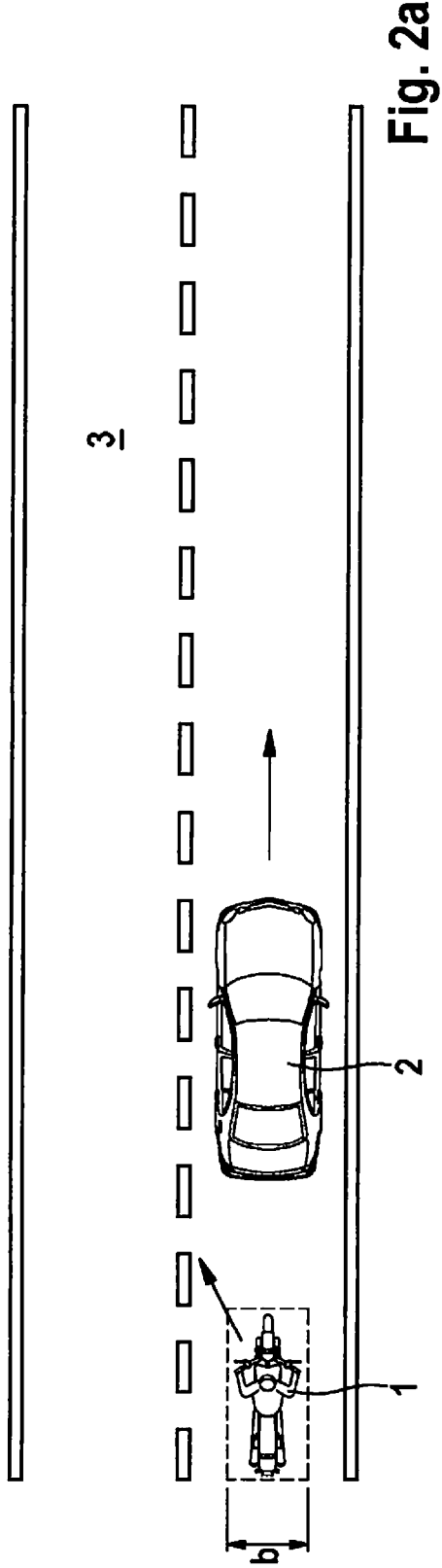
FIG. 2a shows a driving situation of a motorcycle with adaptive cruise control and a preceding other passenger car, according to an example embodiment of the present invention.
Figure 2B:
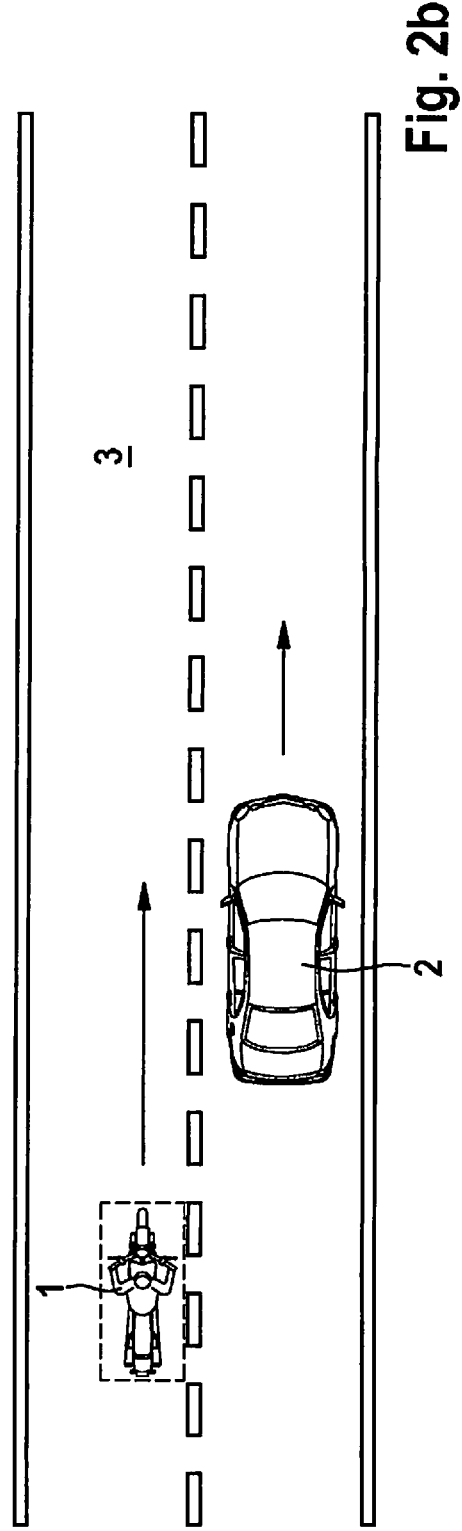
FIG. 2b shows a representation corresponding to FIG. 2a, but with the motorcycle during a passing maneuver in the other traffic lane, according to an example embodiment of the present invention.

FIGS. 2a and 2b show a driving situation with a passenger car as other vehicle 2, that motorcycle 1 is following. Minimum lateral distance b of motorcycle 1 is narrower than in the case of FIGS. 1a and 1b with a preceding other motorcycle. The reason lies in the greater width of the passenger car as other vehicle 2 in comparison to a preceding other motorcycle. As minimum lateral distance b of motorcycle 1 is selected to be smaller, e.g., within a value range between 0.80 m and 1.50 m, a passing maneuver able to be executed more swiftly and smoothly is feasible. Because of the greater width of the passenger car, it is only possible to pass other vehicle 2 if motorcycle 1 changes to the passing lane.

Advantageously, the adaptive cruise control system has an input unit via which the driver of motorcycle 1 is able to enter the type of the preceding vehicle. In the case of FIGS. 1a and 1b, the driver of motorcycle 1 selects a motorcycle as other vehicle, and in the case of FIGS. 2a and 2b, the driver of motorcycle 1 selects an automobile as other vehicle. Thereupon, minimum lateral distances b are selected automatically as parameters in the adaptive cruise control system in the motorcycle and used as the basis of the distance control.

What is claimed is:

1. A method for a motorcycle, the method comprising:
   obtaining a type of another vehicle that is at least one of laterally offset from the motorcycle and, in a travel direction of the motorcycle, is in front of the motorcycle, wherein the types of the other vehicle includes an other motorcycle and an automobile;
   determining, via a processor, a minimum lateral distance targeted to be maintained between the motorcycle and the other vehicle, wherein the determination of the minimum lateral distance is based on the type of the other vehicle; and
   automatically adjusting, as a function of an actual longitudinal distance and an actual lateral distance of the motorcycle from the other vehicle, a speed of the motorcycle to maintain the minimum lateral distance;
   wherein the actual longitudinal distance, the actual lateral distance, and the minimum lateral distance are the only environmental information taken into consideration for the automatic adjustment of the speed,
   wherein the processor stores a plurality of predefined values of the minimum lateral distance each in association with a respective one of a plurality of vehicle types, and the determining of the minimum lateral distance includes selecting one of the plurality of predefined values that is associated with the type of the other vehicle,
   wherein when the type of the other vehicle is the automobile, the determination of the minimum lateral distance is performed such that a smallest value that can be determined for the minimum lateral distance is in a value range of 0.80 m to 1.50 m, and
   wherein when the type of the other vehicle is the other motorcycle, the determination of the minimum lateral distance is performed such that a largest value that can be determined for the minimum lateral distance is in a value range of 1.60 m to 2.50 m.

2. The method of claim 1, wherein the minimum lateral distance is determined such that the narrower the other vehicle, the greater the minimum lateral distance.

3. The method of claim 1, wherein the obtaining of the type of the other vehicle is by a user setting an input.

4. The method of claim 1, wherein the obtaining of the type of the other vehicle is based on a selection from a set of only two different vehicle-type classes that are each associated with a different respective minimum lateral distance.

5. A control unit of a motorcycle, comprising:
   a processor; and
   an interface to a sensor;
   wherein the processor is configured to perform the following:
   obtaining a type of another vehicle that is at least one of laterally offset from the motorcycle and, in a travel direction of the motorcycle, is in front of the motorcycle, wherein the types of the other vehicle includes an other motorcycle and an automobile;
   determining a minimum lateral distance targeted to be maintained between the motorcycle and the other vehicle, wherein the determination of the minimum lateral distance is based on the type of the other vehicle;
   obtaining via the interface to the sensor a longitudinal distance and a lateral distance of the motorcycle from the other vehicle; and
   automatically adjusting, as a function of an actual longitudinal distance and an actual lateral distance of the motorcycle from the other vehicle, a speed of the motorcycle to maintain the minimum lateral distance;
   wherein the actual longitudinal distance, the actual lateral distance, and the minimum lateral distance are the only environmental information taken into consideration for the automatic adjustment of the speed,
   wherein the processor stores a plurality of predefined values of the minimum lateral distance each in association with a respective one of a plurality of vehicle types, and the determining of the minimum lateral distance includes selecting one of the plurality of predefined values that is associated with the type of the other vehicle,
   wherein when the type of the other vehicle is the automobile, the determination of the minimum lateral distance is performed such that a smallest value that can be determined for the minimum lateral distance is in a value range of 0.80 m to 1.50 m, and
   wherein when the type of the other vehicle is the other motorcycle, the determination of the minimum lateral distance is performed such that a largest value that can be determined for the minimum lateral distance is in a value range of 1.60 m to 2.50 m.

6. A motorcycle adaptive cruise control system, comprising:
   a sensor; and
   a processor, wherein the processor is configured to perform the following:
   obtaining a type of another vehicle that is at least one of laterally offset from the motorcycle and, in a travel direction of the motorcycle, is in front of the motorcycle, wherein the types of the other vehicle includes an other motorcycle and an automobile;
   determining a minimum lateral distance targeted to be maintained between the motorcycle and the other vehicle, wherein the determination of the minimum lateral distance is based on the type of the other vehicle;
   obtaining from the sensor a longitudinal distance and a lateral distance of the motorcycle from the other vehicle; and
   automatically adjusting, as a function of an actual longitudinal distance and an actual lateral distance of the motorcycle from the other vehicle, a speed of the motorcycle to maintain the minimum lateral distance;
   wherein the actual longitudinal distance, the actual lateral distance, and the minimum lateral distance are the only environmental information taken into consideration for the automatic adjustment of the speed,
   wherein the processor stores a plurality of predefined values of the minimum lateral distance each in association with a respective one of a plurality of vehicle types, and the determining of the minimum lateral distance includes selecting one of the plurality of predefined values that is associated with the type of the other vehicle,
   wherein when the type of the other vehicle is the automobile, the determination of the minimum lateral distance is performed such that a smallest value that can be determined for the minimum lateral distance is in a value range of 0.80 m to 1.50 m, and
   wherein when the type of the other vehicle is the other motorcycle, the determination of the minimum lateral distance is performed such that a largest value that can be determined for the minimum lateral distance is in a value range of 1.60 m to 2.50 m.

7. The motorcycle adaptive cruise control system of claim 6, further comprising:

an input, wherein the obtaining of the type of the other vehicle is by receiving a user selection of the type of the other vehicle via the input.

* * * * *